Figure 1:
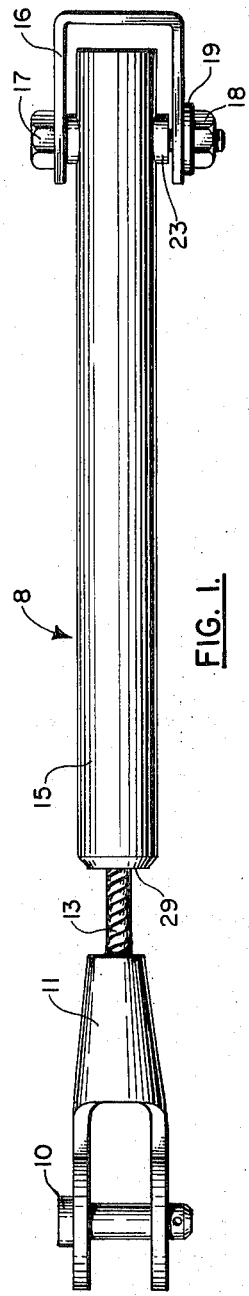

United States Patent [19]
Chauncey

[11] 3,787,069
[45] Jan. 22, 1974

[54] TRAILER HITCH WITH AUXILIARY SAFETY CONNECTIONS

[76] Inventor: Edward W. Chauncey, Rt. 1, Box 519, Walker, La. 70785

[22] Filed: May 22, 1972

[21] Appl. No.: 255,451

[52] U.S. Cl............................ 280/486, 280/432
[51] Int. Cl............................................ B62d 53/06
[58] Field of Search.... 280/446, 457, 459, 483–489, 280/432, 446 B; 267/71

[56] References Cited
UNITED STATES PATENTS

| | | | |
|---|---|---|---|
| 2,808,272 | 10/1957 | Reese | 280/484 X |
| 1,208,430 | 12/1916 | Wigle | 267/71 R |
| 3,140,080 | 7/1964 | Rumsey | 280/486 X |
| 2,125,702 | 8/1938 | Watson | 280/486 X |
| 2,709,604 | 5/1955 | Hartman | 280/489 X |
| 2,689,750 | 9/1954 | Van Horn | 280/457 R |
| 2,650,101 | 8/1953 | Frankfother | 280/457 R |

Primary Examiner—Leo Friaglia
Assistant Examiner—Randall A. Schrecengost

[57] ABSTRACT

An apparatus for securing a trailer to a towing vehicle comprising at least two connecting means attached to the tongue of the trailer, the connecting means including cylinder means connected to the trailer, spring means located inside the cylinder means, and cable means connecting the spring means to the towing vehicle.

9 Claims, 5 Drawing Figures

PATENTED JAN 22 1974 3,787,069

SHEET 1 OF 2

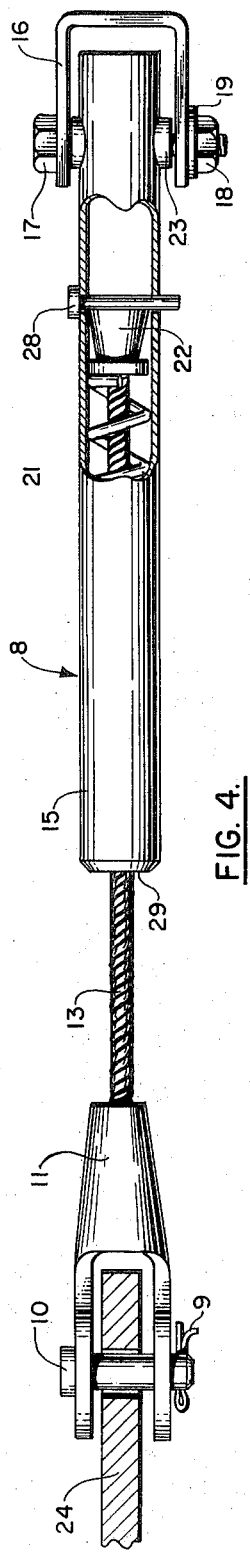
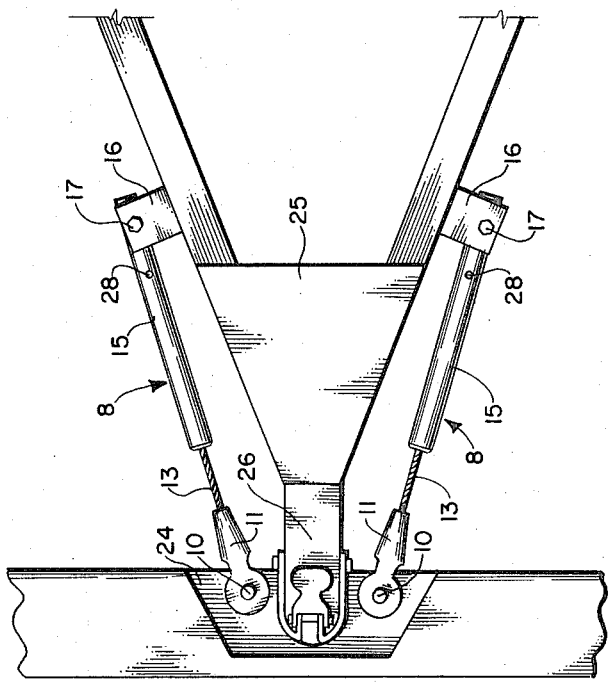
FIG. 4.
FIG. 5.

TRAILER HITCH WITH AUXILIARY SAFETY CONNECTIONS

BACKGROUND OF THE INVENTION

The present invention relates generally to vehicle and trailer connections, but more particularly to a safety hitch for trailers. In particular, this invention is directed to an added hitch construction which is to be used in conjunction with the customary conventional main hitch, such as a ball and socket hitch, between the draft means on a truck or other leading vehicle, and a trailer tongue. The number of trailers in general use on the highways today and the danger resulting from the failure of a coupling imposes a great deal of attention upon the development of a safety device adapted to hold a trailer on failure of the main or primary attachemnt.

Several factors must be taken into consideration in designing such a hitch. Not only must there be freedom of movement about a vertical axis as the vehicle turns the corner, but a considerable amount of hinge action on a horizontal axis also takes place as the pulling vehicle and the trailer go over bumps or sharply crested hills.

The usual trailer hitch centers primarily on a bolt or ball acting as a hinge pin arranged on a vertical axis. To avoid the danger resulting from the failure of the primary hinge connection, it is the usual custom to connect chains or cables from the trailer to a portion of the towing vehicle on opposite sides of the primary hitch. Failure of the hitch will then not result in the complete loss of control of the trailer. The chains still maintain a certain degree of movement of attachemnt to the towing vheicle. As is obvious, the trouble with this arrangement is simply the fact that the use of chains still establishes enough freedom between the trailer and the towing vehicle that the directional stability of the trailer is extremely bad. In addition, the chains frequently break due to the shock placed thereon immediately after the primary hitch fails.

Many different kinds of safety type auxiliary trailer hitches have been disclosed in the prior art. U.S. Pat. Nos. 2,838,325; 2,689,750; 2,464,392; 2,459,965; 2,294,710; 1,289,141; 1,208,430; 1,006,950; and 537,346 disclose various types of connection devices. It is therefore the primary object of the present invention to provide an auxiliary type trailer hitch which is structurally and functionally superior to the auxiliary trailer hitches of the prior art, in addition to being simpler in construction and lower in cost.

THE INVENTION

In accordance with the present invention there is provided an apparatus for securing a trailer to the draft member of a towing vehicle, including at least two connecting means attached to the tongue of the trailer, the connecting means including cylinder means connected to the trailer, spring means located inside said cylinder means, and cable means connecting said spring means to said other vehicle.

Figure 2:
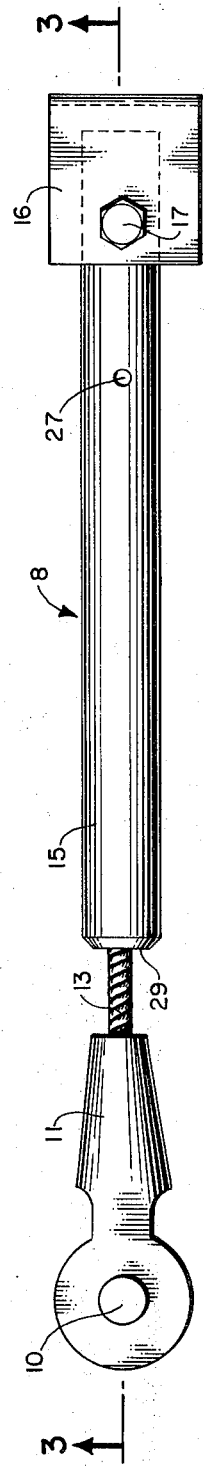
Figure 3:
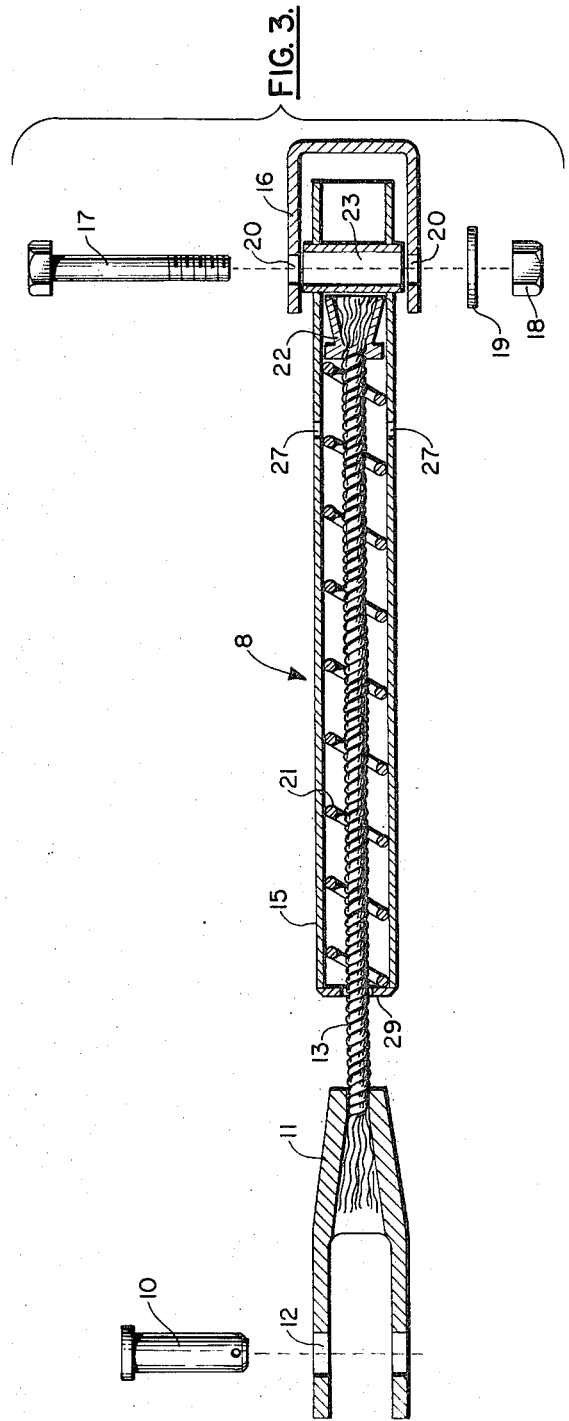

The invention will be more clearly understood by referring to the drawings in which FIG 1—shows a side view of one of the connecting means of the present invention;

FIG. 2—shows the top view of one of the connecting means of the present invention;

FIG. 3—is a cross-sectional view of the connecting means of the present invention taken along lines 3—3 of FIG. 2;

FIG. 4—is a partly sectional side view of the connecting means of the present invention; and FIG. 5—is a top view of a trailer tongue connected to a towing vehicle by the connecting means of the present invention.

Referring now to FIGS. 4 and 5, connecting means 8 can be seen to connect trailer tongue 25 to draft member 24. Draft member 24 is connected to the towing vehicle (not shown) and may be a truck or automobile rear bumper, for example. As seen in FIG. 4, pin 10 connects one end of connecting means 8 to draft member 24. The other end of connecting means 8 is is attached to trailer tongue 25 by bracket 16. Bracket 16 may be connected to trailer tongue 25 by any suitable means such as welding, bolting, and the like.

The exterior element of connecting means 8 can be seen most clearly by reference to FIGS. 1 and 2. Pin 10 fits through hole 12 in clevis 11 to connect the clevis to the draft member shown in FIGS. 4 and 5. Clevis 11 is connected to flexible wire cable 13 by any suitable means such as welding, clamping, and the like. Cable 13 extends into the interior of cylinder 15. Cylinder 15 is connected to bracket 16 by bolt 17 and nut 18. Bolt 17 fits through holes 20—20, shown in FIG. 3, of bracket 16 and through the cylindrical hole 23 in cylinder 15. A washer may be optionally connected between the nut 18 and bracket 16.

The interior of cylinder 15 can be seen in FIGS. 3 and 4. As can be seen in FIG. 3, cable 13 extends through the interior of spring 21, the spring 21 being located in the interior of cylinder 15. Spring 21 may be any conventional helical metal spring. The end of cable 13 located in cylinder 15 is connected to slide 22 by clamping, welding, or any other suitable means. Slide 22 engages spring 21 when clevis 11 is pulled away from cylinder 15, thereby depressing spring 21 and increasing the force exerted by draft member 24 on trailer tongue 25. Cable 13 travels back and forth through a hole in the end 29 of cylinder 15. The end 29 of cylinder 15 also holds spring 21 within the cylinder. As can be seen in FIGS. 2,3 and 4, a hole 27 is located in cylinder 15 at some distance from the end 29 of cylinder 15. When clevis 11 is drawn away from cylinder 15 thereby compressing spring 21 sufficiently to allow slide 22 to slide past hole 27 toward the end 29 of cylinder 15, a pin 28 may be inserted into hole 27. Spring 21 is thereby placed under compression and, as a result thereof, more force is required to pull clevis 11 away from cylinder 15 then was required when pin 28 was removed from hole 27 and spring 21 was fully extended. The hole may be located any desired distance along the length of cylinder 15 to provide the desired amount of compression on spring 21.

The length of the cable 13 is chosen to be such that should trailer hitch 26 become disattached from the standard ball connection (not shown in the drawings) mounted on draft member 24, the trailer tongue could not slide a sufficient distance backward from draft member 24 to allow the trailer tongue to fall off of draft member 24. Before it reaches the point at which the trailer hitch 26 would fall off of draft member 24, spring 21 would be fully compressed and would not allow clevis 11 to extend any greater distance away from cylinder 15.

It is preferred that cable 13 be a flexible cable, such as steel wire cable, etc., but it is conceivable that cable 13 could be a solid metal rod made of steel or other similar metal, or be made from an organic polymer such as nylon or polystyrene, for example. The various other components of the invention may be made from steel or other metal alloys well known in the art.

The foregoing is considered as illustrative only of the principles of the invention. Further, since numerous modifications or changes will readily occur to those skilled in the art, it is not desired to limit the invention to the exact construction and operation shown and described.

What is claimed is:

1. An apparatus for securing a trailer to a towing vehicle having a ball trailer hitch, comprising:
   a. cylinder means having a first end and a second end,
   b. bracket means attached to said first end of said cylinder means for connecting said cylinder means to said trailer,
   c. spring means located inside said cylinder means,
   d. cable means extending through said second end of said cylinder means, said cable means having a first end and a second end,
      i. said first end of said cable means being located outside said cylinder means and having means connected thereto for connecting said cable means to said towing vehicle at a point adjacent said ball trailer hitch, and
      ii. said second end of said cable means being located inside said cylinder means and having slide means connected thereto for contacting and compressing the spring means against said second end of said cylinder means.

2. The apparatus of claim 1 wherein said cylinder means is a hollow cylinder.

3. The apparatus of claim 2 wherein said cylinder has a hole in said second end for receipt of said cable means.

4. The apparatus of claim 1 wherein said spring means comprises a helical metal spring, said helical spring being located inside said cylinder means.

5. The apparatus of claim 4 wherein the outside diameter of said helical spring is equal to the inside diameter of said cylinder means.

6. The apparatus of claim 1 wherein said first means for connecting said cylinder to a trailer comprises a "U"-shaped bracket having a bolt therein.

7. The apparatus of claim 1 wherein said second means for connecting said cable to said towing vehicle comprises a clevis means.

8. The apparatus of claim 1 wherein said cylinder means has hole means therein between said first end and said second end for receipt of a pin.

9. The apparatus of claim 1 wherein said cable means is of sufficient length to prevent the tongue of said trailer from falling off of said towing vehicle.

* * * * *